United States Patent [19]

Markusch et al.

[11] Patent Number: 5,462,766

[45] Date of Patent: Oct. 31, 1995

[54] POLYURETHANE CARPET BACKING PROCESS BASED ON POLYMERIC MDI QUASI-PREPOLYMERS

[75] Inventors: Peter H. Markusch, McMurray, Pa.; James W. Rosthauser, Glen Dale, W. Va.

[73] Assignee: Bayer Corporation, Pittsburgh, Pa.

[21] Appl. No.: 196,321

[22] Filed: Feb. 15, 1994

[51] Int. Cl.$^6$ .................. B05D 3/10; B05D 3/02
[52] U.S. Cl. .......................... 427/244; 427/373
[58] Field of Search .................... 427/244, 373, 427/389.9

[56] References Cited

U.S. PATENT DOCUMENTS

| | | | |
|---|---|---|---|
| 3,849,156 | 11/1974 | Marlin et al. | 427/277 |
| 4,096,303 | 6/1978 | Doerfling | 427/316 |
| 4,132,817 | 1/1979 | Tillotson | 427/244 |
| 4,189,543 | 2/1980 | Doorakian et al. | 521/128 |
| 4,202,956 | 5/1980 | Taylor | 528/75 |
| 4,275,172 | 6/1981 | Barth et al. | 427/385.5 |
| 4,278,482 | 7/1981 | Poteet et al. | 156/78 |
| 4,296,159 | 10/1981 | Jenkines et al. | 428/95 |
| 4,397,978 | 8/1983 | McKinney et al. | 524/409 |
| 4,435,459 | 3/1984 | McKinney et al. | 428/95 |
| 4,515,846 | 5/1985 | McKinney et al. | 428/95 |
| 4,525,405 | 6/1985 | McKinney et al. | 428/95 |
| 4,543,366 | 9/1985 | Smith | 427/236 |
| 4,611,044 | 9/1986 | Meyer et al. | 528/56 |
| 4,657,790 | 4/1987 | Wing et al. | 427/374.1 |
| 4,675,211 | 6/1987 | Thoma et al. | 427/208.8 |
| 4,692,383 | 9/1987 | Schmitt et al. | 427/410 |
| 4,696,849 | 9/1987 | Mobley et al. | 428/95 |
| 4,853,054 | 8/1989 | Turner et al. | 156/78 |
| 4,853,280 | 8/1989 | Poteet | 428/286 |
| 4,913,958 | 4/1990 | Skaggs et al. | 428/318.6 |
| 5,102,714 | 4/1992 | Mobley et al. | 428/95 |
| 5,104,693 | 4/1992 | Jenkines | 427/244 |
| 5,200,435 | 4/1993 | DeGenova et al. | 521/159 |
| 5,332,457 | 7/1994 | Katoh | 427/412 |

*Primary Examiner*—Diana Dudash
*Attorney, Agent, or Firm*—Joseph C. Gil; N. Denise Brown

[57] ABSTRACT

This invention relates to a process for the production of a polyurethane cushion backing on a substrate. In particular, the polyurethane to be used in the process is produced by the reaction of an isocyanate and a polyol mixture, wherein the isocyanate is based on polymethylene poly(phenylisocyanate) and having a monomer content of less than 55%, a 2,2'- and 2,4'-methylene bis(phenylisocyanate) content of less than 3%, a functionality of less than 2.5, an isocyanate group content of 25 to 30%, and a urethane group content of about 2 to 6%.

15 Claims, No Drawings

POLYURETHANE CARPET BACKING PROCESS BASED ON POLYMERIC MDI QUASI-PREPOLYMERS

BACKGROUND OF THE INVENTION

The present invention relates to a process for the production of a polyurethane cushion backing on a substrate. This invention requires an isocyanate based on polymethylene poly(phenylisocyanate) having a monomer content of less than 55%, a 2,2'- and 2,4'-methylene bis(phenylisocyanate) content of less than 3%, a functionality of less than 2.5, an isocyanate group content of 25 to 30%, and a urethane group content of from about 2 to 6%.

Various methods for the production of polyurethane cushion backing on substrates, particularly carpets, are well known and described in, for example, U.S. Pat. Nos. 4,132,817 and 4,278,482. These patents also describe different apparatus for the processes described therein.

Several patents disclose the use of general polyurethane formulations in combination with specific additives, including, for example, catalysts (U.S. Pat. Nos. 4,189,543, 4,515,846, and 4,611,044), fire suppressants (U.S. Pat. Nos. 4,397,978 and 4,435,459) and fillers (U.S. Pat. Nos. 4,296,159 and 4,525,405). There are also patents relating to the use of general polyurethane formulations in specific processes (U.S. Pat. Nos. 4,657,790 and 4,913,958), or in conjunction with specific types of textiles (U.S. Pat. No. 4,853,280).

There are also numerous patents relating to specific formulations based upon various isocyanates and specific polyol blends. For example, U.S. Pat. No. 4,696,849 discloses isocyanates with a polyol containing at least 30% primary hydroxyl groups; U.S. Pat. No. 4,853,054 discloses isocyanates having an average functionality of about 1.9 to 2.4 with a polyol having an EO content of from about 15 to 30% by weight. U.S. Pat. Nos. 5,102,714 and 5,227,409 relate to isocyanates having an average functionality of about 2.2 or less with a polyol having an average functionality of 2.2 or less, and equivalent weight of at least 500 and containing from 10 to 70 mole percent of monoalcohol.

U.S. Pat. Nos. 4,296,159, 4,696,849, and 5,104,693 all describe polyurethane compositions which are suitable for the production of polyurethane backed substrates, particularly carpets. U.S. Pat. No. 4,296,159 discloses a polyurethane comprising a high molecular weight polyether polyol, a low molecular weight polyol, and organic polyisocyanate or polyisothiocyanate, and an inorganic filler. The isocyanate used in the examples are either isocyanate prepolymers based on toluene diisocyanate, or a modified diphenylmethane diisocyanate. TDI monomer is less desirable from an industrial hygiene standpoint.

The polyurethane composition disclosed in U.S. Pat. No. 4,696,849 that is suitable for carpet backing comprises a specific high equivalent weight polyol composition, a low equivalent weight compound having 2 active hydrogen atoms, a polyisocyanate, and a catalyst. Toluene diisocyanate, 2,4'- and 4,4'-diphenylmethanediisocyanates, and the isocyanate-terminated prepolymers thereof are said to be suitable isocyanates. However, the isocyanates may only contain minor amounts of the corresponding polymeric derivatives as the average functionality of the reactive components (i.e. all the active hydrogen containing components and isocyanates) must range from 1.97 to 2.03.

U.S. Pat. No. 5,104,693 discloses polyurethane compositions which are suitable for carpet backing comprising an isocyanate-reactive material having an average equivalent weight of 1000 to 5000, a blowing agent, and a polyisocyanate wherein at least 30% by weight of the polyisocyanate is a methylene bis(phenylisocyanate) soft segment prepolymer having an NCO content of about 10 to 30% by weight. This soft segment prepolymer has an average functionality of about 1.9 to 2.5, and is prepared by reacting MDI with an organic polymer having an equivalent weight of from about 500 to 5000, preferably from 1000 to 3000.

The present invention has several advantages. These include an isocyanate containing no TDI monomer, which means the isocyanate is environmentally safer and easier to handle; and the reaction has a fast cure time and produces a polyurethane with good flexibility. This particular combination of processing and properties is important in the carpet backing industry.

DESCRIPTION OF THE INVENTION

The present invention relates to a process for the production of a polyurethane cushion backing on a substrate comprising the steps of a) mixing an isocyanate and a polyol mixture to form a reaction mixture, b) applying the reaction mixture to the substrate, and c) curing the reaction mixture to form the polyurethane cushion backing. The isocyanate of step a) is based on polymethylene poly(phenylisocyanate) and has a monomer content of less than 55%, a 2,2'- and 2,4'-methylene bis(phenylisocyanate) content of less than 3%, a functionality of less than 2.5, an isocyanate group content of 25 to 30%, and a urethane group content of from about 2 to 6%.

The urethane group content as used herein is defined as:

$$\% \text{ urethane} = \frac{59 \times (\text{OH equivalents}) \times 100}{\text{total weight}}$$

The quantities of the isocyanate and the polyol are such that the isocyanate index ranges from 90 to 180, preferably from 90 to 150, and most preferably from 90 to 130.

The polyol mixture to be used in preparing a reaction mixture with the isocyanate comprises at least one high molecular weight polyol, at least one low molecular weight chain extender, and optionally, fillers, flame retardants, catalysts, surfactants, antioxidants, and other additives known to those skilled in the art of producing a polyurethane cushion backing on substrates. The polyol mixture should have an average functionality of 3.0 or less.

In another embodiment, the isocyanate comprises a blend of 1) from 25 to 75% by weight, preferably about 50% by weight, based on the total weight of said isocyanate component, of a polymethylene poly(phenylisocyanate) mixture having an average functionality of from about 2.5 to 3.0, containing from 0 to 5% by weight of 2,2'- and 2,4'-methylene bis(phenylisocyanate) and about 40 to 45% by weight of 4,4'-methylene bis(phenylisocyanate), and about, 50 to 60% by weight of higher ring polyisocyanate compounds, and having an isocyanate group content of 30 to 32%, and 2) from 75 to 25% by weight, preferably about 50% by weight, based on the total weight of said isocyanate component, of a polyisocyanate adduct prepared by the reaction of 4,4'-methylene bis(phenylisocyanate) with at least one low molecular weight organic compound having average functionality of from 1.0 to 3.0, preferably 1.5 to 2.5, and most preferably from 1.8 to 2.2, and being selected from the group consisting of monoalcohols, diols, and triols, said adduct having an isocyanate group content of 22 to 24%. It is particularly preferred that this polyisocyanate adduct be prepared by the reaction of 4,4'-methylene bis(phenylisocyanate) with tripropylene glycol.

Suitable isocyanates for the present application include those isocyanates based on polymethylene poly(phenylisocyanate) and having a monomer content of less than 55%, a 2,2'- and 2,4'-methylene bis(phenylisocyanate) content of less than 3%, a functionality of less than 2.5, an isocyanate group content of 25 to 30%, and a urethane group content of from about 2 to 6%. These isocyanates generally have a viscosity of less than 500 mPa.s at 25° C. One of ordinary skill in the art knows that there are several ways to prepare the suitable isocyanates for the presently claimed process.

It is possible to prepare these isocyanates, for example, by mixing polymethylene poly(phenylisocyanate) with additional monomeric methylene bis(phenylisocyanate), followed by the addition of a mixture containing at least one low molecular weight organic compound having an average functionality of from 1.0. to 3.0, preferably 1.5 to 2.5, most preferably from 1.8 to 2.2, and being selected from the group consisting of monoalcohols, diols, and triols. Tripropylene glycol, dipropylene glycol, and mixtures thereof are preferred low molecular weight compounds to be used in the preparation of the isocyanate mixture. Alternately, one can make the isocyanate directly from a polymethylene poly(phenylisocyanate) that already contains a relatively high level of monomer (e.g. 50–70%) due to its method of manufacture. In cases where the average functionality of polymeric MDI is already>2.5, it is preferred to use mixtures of monoalcohols and diols/triols to reduce the average functionality of the product.

These isocyanates may also be prepared, for example, by mixing a polymethylene poly(phenylisocyanate) mixture with a polyisocyanate adduct, wherein the adduct is the reaction product 4,4'-methylene bis(phenyleneisocyanate) with at least one low molecular weight organic compound having an average functionality of 1.0 to 3.0, preferably 1.5 to 2.5, and most preferably 1.8 to 2.2, and being selected from the group consisting of monoalcohols, diols, and triols. Preferred low molecular weight compounds include tripropylene glycol and technical mixtures thereof with dipropylene glycol.

Suitable low molecular weight organic compounds to be used in preparing the isocyanate as described hereinabove include those compounds having a molecular weight of less than 500, and an average functionality of from 1.0 to 3.0, preferably 1.5 to 2.5, and most preferably 1.8 to 2.2. These compounds are carefully selected from the group consisting of monoalcohols, diols, triols, and mixtures thereof so that the resulting modified polymeric isocyanates are homogeneous liquids at room temperature. Some examples of suitable compounds include, for example, glycols such as, for example, ethylene glycol, propylene glycol, 1,3-propane diol, 1,4-butanediol, 1,6-hexamethylene glycol, dipropylene glycol, tripropylene glycol, diethylene glycol, triethylene glycol, tetraethylene glycol, tetrapropylene glycol, heptapropylene glycol, neopentyl glycol, 2,2,4-trimethyl-1,5-pentanediol, etc. Suitable monoalcohols include compounds such as, for example, methanol, ethanol, 1-propanol, 1-butanol, 1-pentanol, 2-ethylhexanol, dodecanol, etc. These also include compounds such as, for example, cyclohexanedimethanol and the diverse bisphenols. It is most preferred to use a technical mixture of tri-/di-propylene glycol.

As set forth hereinabove, the present invention also requires a polyol mixture. This polyol mixture comprises at least one high molecular weight polyol and at least one low molecular weight chain extender. This polyol mixture to be reacted with the isocyanate in the preparation of the polyurethane cushion backing may additionally comprise flame retardants, fillers, blowing agents, surfactants, catalysts, colorants, antistatic agents, reinforcing fibers, antioxidants, preservatives, water scavengers, and other additives known to be useful in polyurethane chemistry. Among these, fillers, surfactants, and catalysts are preferred. The polyol mixture should have an average functionality of less than 3.

Suitable polyols for use in the polyol mixture of the present invention include those organic compounds having molecular weights of from 500 to 5000 and containing from 1 to 12 isocyanate reactive hydrogen atoms. These compounds include, for example, polyethers, polyesters, polythioethers, polyacetals, polycarbonates, and amine terminated polyethers of the type known for the production of polyurethanes. Preferred compounds include the polyethers containing from 1.5 to 4.0, preferably 2.0 to 3.0 isocyanate-reactive groups, and having molecular weights of from 500 to 5000, preferably 800 to 3000.

The high molecular weight polyethers suitable for use in accordance with the invention are known and may be obtained, for example, by polymerizing tetrahydrofuran or epoxides such as, for example, ethylene oxide, propylene oxide, butylene oxide, styrene oxide or epichlorohydrin in the presence of suitable catalysts, such as, for example, $BF_3$ or KOH, or by chemically adding these epoxides, preferably ethylene oxide and propylene oxide, in admixture or successively to components containing reactive hydrogen atoms such as water, alcohols or amines. Examples of suitable alcohols and amines include the low molecular weight chain extenders set forth hereinafter, propylene glycol, glycerin, ethylene glycol, triethanolamine, water, trimethylolpropane, bisphenol A, sucrose, aniline, ammonia, ethanolamine and ethylene diamine. It is preferred to use polyethers which contain substantial amounts of primary hydroxyl groups in terminal positions (greater than 80% by weight, based on all of the terminal hydroxyl groups present in the polyether).

Suitable examples of high molecular weight polyesters include, for example, the reaction products of polyhydric, preferably dihydric alcohols (optionally in the presence of trihydric alcohols), with polyvalent, preferably divalent, carboxylic acids. Instead of using the free carboxylic acids, it is also possible to use the corresponding polycarboxylic acid anhydrides or corresponding polycarboxylic acid esters of lower alcohols or mixtures thereof for producing the polyesters. The polycarboxylic acids may be aliphatic, cycloaliphatic, aromatic, and/or heterocyclic and may be substituted, for example, by halogen atoms, and/or unsaturated. The polycarboxylic acids and polyols used to prepare the polyesters are known and described for example in U.S. Pat. Nos. 4,940,750, 4,098,731 and 3,726,952, herein incorporated by reference in their entirety. The following are disclosed as suitable examples: succinic acid, adipic acid, suberic acid, azelaic acid, sebacic acid, phthalic acid, isophthalic acid, terephthalic acid, trimellitic acid, phthalic anhydride, tetrahydrophthalic anhydride, hexahydrophthalic anhydride, tetrahydroisophthalic anhydride, hexahydroisophthalic anhydride, endomethylene tetrahydrophthalic anhydride, glutaric anhydride, maleic anhydride, maleic acid, fumaric acid, dimeric fatty acids such as, for example, oleic acid, and dimethyl terephthalate and mixed terephthalates. Suitable dihydric alcohols include ethylene glycol, 1,3- and 1,2-propylene glycol; 1,4-, 1,3- and 2,3- butylene glycol; 1,6-hexamethylene glycol; 1,8-octanediol; neopentyl glycol; cyclohexanedimethanol or 1,4-bis-(hydroxymethyl)-cyclohexane; 2-methyl- 1,3-propanediol; 2,2,4-trimethyl-1,3-pentanediol; diethylene glycol; dipropylene glycol; triethylene glycol; tripropylene glycol; dibutylene glycol; polyethylene glycol; polypropylene glycol; and polybutylene glycol. The polyesters may also contain a portion of carboxyl end groups. Polyesters of lactones, for example, ε-caprolactone or hydroxycarboxylic acids, for example, ω-hydroxycaproic acid, may also be used.

Suitable polythioethers, polyacetals, polycarbonates and other polyhydroxyl compounds are also disclosed in the above-identified U.S. patents. Finally, representatives of the many and varied compounds which may be used in accordance with the invention may be found, for example, in High Polymers, Volume XVI, "Polyurethanes, Chemistry and Technology," by Saunders-Frisch, Interscience Publishers, New York, London, Vol. I, 1962, pages 32–42 and 44–54, and Volume II, 1964, pages 5–6 and 198–199; and in Kunststoff-Handbuch, Vol. VII, Vieweg-Hochtlen, Carl Hanser Verlag, Munich, 1966, pages 45–71.

Suitable low molecular weight chain extenders to be used in the polyol mixture include organic compounds having a molecular weight of less than 500, and an average functionality of from 1.0 to 3.0, preferably 1.5 to 2.5, and most preferably 1.8 to 2.2. These compounds are selected from the group consisting of monoalcohols, diols, triols, and mixtures thereof. Some examples of suitable compounds include, for example, glycols such as, for example, ethylene glycol, propylene glycol, 1,2- and 1,3-propane diol, 1,3- and 1,4- and 2,3-butanediol, 1,6-hexanediol, dipropylene glycol, tripropylene glycol, diethylene glycol (i.e. DEG), triethylene glycol (i.e. TEG), tetraethylene glycol, tetrapropylene glycol, heptapropylene glycol, 2-methyl-1,3-propanediol, 1,10-decanediol, neopentyl glycol, and 2,2,4-trimethylpentane-1,3- diol, etc. Suitable monoalcohols include compounds such as, for example, methanol, ethanol, 1-propanol, 2-propanol, n-butanol, 1-pentanol, 2-ethyl-1-hexanol, stearyl alcohol, and alkyl substituted phenols containing from 1 to 22 carbon atoms in the alkyl group such as, for example, nonylphenol. Preferred chain extenders include DEG, TEG, and mixtures thereof, and also symmetrical diols such as, for example, 1,4-butanediol and 1,6-hexanediol.

In addition to the above compounds, suitable chain extenders also include amino alcohols. Some examples of suitable alkanolamines include ethanolamine, diethanolamine, N-methyldiethanolamine, N-ethyl diethanol-amine, triethanolamine, etc. For reasons of slower reactivity, compounds containing solely active hydrogen atoms based on hydroxyl groups and not on amine groups are preferred. The preferred alkanolamines are the N-substituted diethanolamines.

Suitable catalysts to be used in the present invention include, for example, tertiary amine compounds and organometallic catalysts. The preferred catalysts are heat-activated.

Some examples of suitable organometallic catalysts include, for example organometallic compounds of tin, lead, iron, bismuth, mercury, etc. Preferred organotin catalysts include compounds such as, for example, tin acetate, tin octoate, tin ethylhexanoate, tin oleate, tin laurate, dimethyltin dilaurate, dibutyltin oxide, dibutyltin dichloride, dimethyltin dichloride, dibutyltin diacetate, diethyltin diacetate, dimethyltin diacetate, dibutyltin dilaurate, diethyltin dilaurate, dimethyltin dilaurate, dibutyltin maleate, dimethyltin maleate, dioctyltin diacetate, dioctyltin dilaurate, di(2-ethylhexyl)tin oxide, etc. Delayed action or heat-activated tin catalysts such as, for example, dibutyltin dimercaptide, dibutyltin diisooctylmercaptoacetate, dimethyltin dimercaptide, dibutyltin dilaurylmercaptide, dimethyltin dilaurylmercaptide, dimethyltin diisooctylmercaptoacetate, di(n-butyl)tin bis(isooctylmercaptoacetate), and di(isooctyl)tin bis(isooctylmercaptoacetate), all of which are commercially available from Witco Chemical Corp., are especially preferred. The use of a delayed action catalyst such as an iron pentanedione or a bismuth carboxylate, as described in U.S. Pat. No. 4,611,044, herein incorporated by reference, is also possible.

Suitable heat-activated catalysts for the present invention are amine salts. These catalysts include aliphatic and aromatic tertiary amines. Suitable heat-activated amine salts include compounds such as, for example, DABCO 8154 commercially available from Air Products, a formic acid blocked triethylene diamine, and other delayed action catalysts such as DABCO WT, also commercially available from Air Products; and Polycat SA-1 and Polycat SA-102 which are both acid-blocked versions of 1,8- diazabicyclo[5.4.0]undecene-7 (i.e. Polycat DBU) and commercially available from Air Products. Trialkyl amines and heterocyclic amines are also suitable for the present invention. Suitable compounds include, for example, trimethylamine, triethylamine, tripropylamine, tributylamine, dimethylcyclohexylamine, dibutylcyclohexylamine, dimethylethanolamine, triethanolamine, diethylethanolamine, ethyldiethanolamine, dimethylisopropanolamine, triisopropanolamine, triethylene diamine, tetramethyl-1,3-butanediamine, N,N,N',N'-tetramethylethylenealiamine, N,N,N',N'-tetramethylhexanediamine-1,6, N,N,N',N',N"-pentamethyldiethylenetriamine, bis(2-dimethylaminoethoxy)-methane, N,N,N'-trimethyl-N'-(2-hydroxyethylethyldiamine, N,N-dimethyl-N',N'-(2-hydroxyethyl)-ethylenediamine, tetramethylguanidine, N-methylpiperidine, N-ethylpiperidine, N-methylmorpholine, N-ethylmorpholine, 1,4-dimethylpiperidine, 1,2,4-trimethylpiperidine, N-(2-dimethylaminoethyl)-morpholine, 1-methyl-4-(2-dimethylamino)-piperidine, 1,4-diazabicyclo[2.2.2]octane, 2-methyl-1,4-diazabicyclo[2.2.2]octane quinuclidine, 1,5-diazabicyclo[5.4.0]-5-undecene, and 1,5-diazabicyclo[4.3.0]-5-nonane.

Organometallic catalysts are usually used in amounts ranging from about 0.001 to about 0.1, preferably about 0.005 to 0.05 parts per 100 parts of isocyanate-reactive material. Tertiary amine (salt) catalysts are advantageously used in amounts ranging from about 0.01 to about 5, preferably about 0.1 to about 2 parts per 100 parts of isocyanate-reactive compounds. It is most preferred that the catalysts be used in quantities such that they comprise less than 1%, preferably less than 0.5% of the total composition.

It is usually desirable to include a filler in the reaction mixture, in order to reduce costs and improve some physical properties. Useful fillers include materials such as, for example, calcium carbonate, alumina trihydrate, titanium dioxide, iron oxide, barium sulfate, etc. In general, fillers are usually used in quantities of from about 20 to 300 parts per 100 parts of the polyol mixture.

It is also possible that the polyol mixture includes, for example, flame retardants, surfactants, colorants, antistatic agents, reinforcing fibers, antioxidants, preservatives, water scavengers, blowing agents, and the like.

The reaction mixtures of the present invention are usually foamed by mixing in gases. However, this can also be done using water, and other auxiliary blowing agents, including hydrocarbons, fluorocarbons, fluorohydrocarbons, chlorofluorocarbons, etc.

In the present invention, the term "blowing agent" is used rather broadly to include any compound which may be incorporated into the reaction mixture, as well as other materials which volatilize, decompose, react, or otherwise generate a gas under the conditions encountered in the formation of the polyurethane layer. Frothing is the preferred method of reducing density of the polyurethane, and the preferred blowing agent is air, nitrogen, argon, helium, or another gas that is inert to the reaction mixture. Air and nitrogen are most preferred gases. Alternatively, or in conjunction with the gas, water, low boiling organic compounds (including the halogenated and non-halogenated types), the so-called "azo" blowing agents, and the like can be used.

It is preferred to use a surfactant in the reaction mixture of the present invention. Surfactants include block copolymers of ethylene oxide or mixtures of a major amount of ethylene oxide with a minor amount of propylene oxide and dimethylsiloxane. The more preferred surfactants are block copolymers containing 15 to about 40 weight percent polydimethylsiloxane, a polyether block containing at least about 60 weight percent oxyethylene units, and a molecular weight below 30,000 as described in U.S. Pat. No. 4,483,894, the disclosure of which is herein incorporated by reference. A sufficient amount of the surfactant is used to stabilize the cells of the foaming reaction mixture until curing occurs, and to produce an even-celled foam. In general, such surfactants are used in amounts ranging from 0.01 to about 2 parts per 100 parts by weight of the high molecular weight polyol.

In preparing polyurethane-backed substrates acccording to the invention, the individual components of the polyurethane-forming composition are mixed and applied as a layer of preferably uniform thickness onto one surface of the substrate. It is often preferred to pre-mix all components except the isocyanate (and blowing agent when the system is frothed) to form a formulated "B-side". This simplifies the metering and mixing of components at the time the polyurethane-forming composition is prepared. In preparing a frothed polyurethane backing, it is preferred to mix all components and then blend a gas into the mixture, using equipment such as an Oakes or Firestone foamer.

The isocyanates described hereinabove have been found to be particularly effective in producing a polyurethane cushion backing for floorings and, especially, for carpets when used with the polyol mixture described hereinabove. Other possible applications include roofing membranes, sound dampening foams, foam shoe inlays, energy absorbing foams, carpet padding, etc.

Other suitable substrates for the polyurethane produced from the presently claimed process include, for example, jute, synthetic jute, nonwoven fibers, especially non-woven polypropylene fiber, treated or non-treated release papers. These substrates can be coated with the polyurethane cushion backing in order to produce roofing membranes or polyurethane carpet padding, which is installed prior to cushion backed or non-backed carpet.

The following examples further illustrate details for the process of this invention. The invention, which is set forth in the foregoing disclosure, is not to be limited either in spirit or in scope by these examples. Those skilled in the art will readily understand that known variations of the conditions of the following procedures can be used. Unless otherwise noted, all temperatures are degrees celsius and all parts are parts by weight.

EXAMPLES

Examples 1–3 use the following general procedure to prepare coated carpet.

In a suitable container, 100 parts of a proprietary polyol blend of a customer of Miles, Inc. having an OH number of about 148 was prepared. To this blend are added 150 parts of alumina trihydrate, and 1 part of a proprietary wetting agent were added. Care is taken during mixing to exclude water. After mixing, the blend was cooled to about 72° F.

About 250 parts of this blend was mixed with 0.08 parts of catalyst, 0.15 parts of a 10% silicone surfactant solution in the polyol blend described hereinabove, and the isocyanate as described hereinbelow in each example. This blend was fed to an Oakes foamer in order to froth the material, using air as the gas.

The frothed blend was combined with 0.1 part of a 10% organotin catalyst solution in the polyol blend described hereinabove, and 0.28 part of water pre-blended in 0.85 part of the polyol blend. The resulting froth had a density of about 0.3 g/cc.

The froth was applied to the back side of a carpet having a polypropylene facing weighing 8 ounces per square yard. The carpet was first passed over a steam chest to "bloom" the yarn, and then heated to about 300° F. on a heated drum. The froth was then deposited as a puddle on the back of the carpet, which was then passed under a doctor blade which shapes the froth into a layer of uniform 0.125" thickness. The coating weight was about 23.5 ounces per square yard.

After the carpet passes the doctor knife, a non-woven polyester scrim (Style No. 2117, commercially available from Hoescht Fibers) was placed onto the surface on the uncured froth. This scrim is composed of randomly oriented 6–8" fibers which have been needle punched to increase strength. The resulting sandwich structure was heated to about 250°–275° F. until the froth was substantially cured. The coated carpet was trimmed to a width of 12 feet and subsequently rolled up to a length of 100 feet.

Example 1

A coated carpet was produced using the general procedure described hereinabove. 43 parts of Isocyanate A were used in this example.

Isocyanate A:

an isocyanate having an average isocyanate functionality of about 2.4, an isocyanate content of about 27.3%, containing about 46% monomeric 4,4'-MDI, about 1% monomeric 2,4'- and 2,2'-MDI isomers, about 28% higher ring homologues of the MDI series, and the remainder being the adduct of 4,4'-MDI with tripropylene glycol such that the urethane group concentration of the mixture was about 4.2%. The viscosity of the mixture was about 300 mPa.s at room temperature. The mixture was prepared by mixing 50 parts of a 133 equivalent weight polymeric isocyanate mixture having an average functionality of about 2.8 and a 2,4'- and 2,2'-MDI isomer concentration of about 2% with 50 parts of a 182 equivalent weight prepolymer prepared by reacting 4,4'-MDI with tripropylene glycol.

The formed foam layer was of uniform thickness. The coated carpet rolled up smoothly without buckling or folding. The foam layer did not crack when the coated carpet was rolled up. It maintained a constant thickness and was not compressed when the carpet rolls were stored.

Example 2: (Comparative Example)

The same general procedure was used herein as described hereinabove, except that 42 parts of Isocyanate B were used.

Isocyanate B:

an isocyanate having an average isocyanate functionality of about 2.35, an isocyanate content of about 27.6%, containing about 42% monomeric 4,4'-MDI, about 8% monomeric 2,4'- and 2,2'-MDI isomers, about 25% higher ring homologues of the MDI series, and the remainder being the adduct of 4,4'-MDI with tripropylene glycol such that the urethane group concentration of the mixture was about 4.2%. The viscosity of the mixture was about 140 mPa.s at room temperature. The mixture was prepared by mixing 50 parts of a 133 equivalent weight polymeric isocyanate mixture having an average functionality of about 2.7 and a 2,4'- and 2,2'-MDI isomer concentration of about 15% with 50 parts of a 182 equivalent weight prepolymer was prepared by reacting 4,4'-MDI with tripropylene glycol.

The foam layer was of uniform thickness as it was applied to the back of the carpet, but it did not maintain it when the coated carpet was rolled up. It compressed unevenly when the carpet rolls were stored so that the foam layer did not have the required dimensional stability. The foam layer at the beginning of the roll was compressed more than the foam layer at the end of the roll.

Example 3: (Comparative Example)

The same general procedure was followed in this example as that described hereinabove, except that 36 parts of Isocyanate C were used.

Isocyanate C:

an isocyanate having an average isocyanate functionality of about 2.6, an isocyanate content of about 32.6%, contains about 56% monomeric 4,4'-MDI, about 2% monomeric 2,4'- and 2,2'-MDI isomers, and about 42% higher ring homologues of the MDI series, It did not contain any urethane groups. The viscosity of the mixture was about 50 mPa.s at room temperature.

The formed foam layer had and maintained uniform thickness. The coated carpet rolled up smoothly without buckling or folding, but the foam layer cracked when the coated carpet was rolled up.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. In a process for the production of a polyurethane cushion backing on a substrate comprising the steps of:
    a) mixing i) an isocyanate and ii) a polyol mixture to form a reaction mixture,
    b) applying said reaction mixture to said substrate, and
    c) curing said reaction mixture to form said polyurethane cushion backing,
the improvement wherein i) said isocyanate is based on a polymethylene poly(phenylisocyanate) and having a monomer content of less than 55%, a 2,2'- and 2,4'-methylene bis(phenylisocyanate) content of less than 3%, a functionality of less than 2.5, an isocyanate group content of 25 to 30%, and a urethane group content of from about 2 to 6%, and i) said isocyanate is prepared by mixing polymethylene poly(phenylisocyanate) with additional monomeric methylene bis(phenylisocyanate) to form 1) an isocyanate mixture, then reacting 1) said isocyanate mixture with 2) one or more organic compounds having a molecular weight of less than 500, an average functionality of from 1.0 to 3.0 and being selected from the group consisting of monoalcohols, diols, triols and mixtures thereof, to form i) said isocyanate.

2. The process of claim 1, wherein said reaction mixture additionally comprises at least one filler.

3. The process of claim 2, wherein said filler is selected from the group consisting of calcium carbonate, alumina trihydrate and mixtures thereof.

4. The process of claim 1, wherein said organic compound has an average functionality of from 1.5 to 2.5.

5. The process of claim 1, wherein said organic compound has an average functionality of from 1.8 to 2.2.

6. The process of claim 1, wherein said organic compound is selected from the group consisting of tripropylene glycol, dipropylene glycol and mixtures thereof.

7. The process of claim 1, wherein said 2,2'- and 2,4'-methylene bis(phenylisocyanate) content of i) said isocyanate is no more than about 1%.

8. In a process for the production of a polyurethane cushion backing on a substrate comprising the steps of:
    a) mixing i) an isocyanate and ii) a polyol mixture to form a reaction mixture,
    b) applying said reaction mixture to said substrate, and
    c) curing said reaction mixture to form said polyurethane cushion backing,
the improvement wherein i) said isocyanate is based on a polymethylene poly(phenylisocyanate) and having a monomer content of less than 55%, a 2,2'- and 2,4'-methylene bis(phenylisocyanate) content of less than 3%, a functionality of less than 2.5, an isocyanate group content of 25 to 30%, and a urethane group content of from about 2 to 6%, and i) said isocyanate is prepared from a blend comprising:
    1) 25 to 75% by weight, based on the total weight of i) said isocyanate component, of a polymethylene poly(phenyl isocyanate) mixture having an average functionality of from about 2.5 to 3.0, containing from 0 to 5% by weight of 2,2'- and 2,4'-methylene bis(phenylisocyanate) and about 40 to 45% by weight of 4,4'-methylene bis(phenylisocyanate), and about 50 to 60% by weight of higher ring polyisocyanate compounds, and having an isocyanate group content of 30 to 32% by weight, and
    2) 75 to 25% by weight, based on the total weight of i) said isocyanate component, of a polyisocyanate adduct having an isocyanate group content of 22 to 24% by weight, said polyisocyanate adduct being prepared by reacting 4,4'-methylene bis(phenylisocyanate) with one or more organic compounds having a molecular weight of less than 500, an average functionality of from 1.0 to 3.0 and being selected from the group consisting of monoalcohols, diols, triols and mixtures thereof, to form said polyisocyanate adduct.

9. The process of claim 8 wherein said organic compound has an average functionality of from 1.5 to 2.5.

10. The process of claim 8, wherein said organic compound has an average functionality of from 1.8 to 2.2.

11. The process of claim 8, wherein said organic compound is selected from the group consisting of tripropylene glycol, dipropylene glycol and mixtures thereof.

12. The process of claim 8, wherein said isocyanate comprises a blend of:
    1) about 50% by weight, based on the total weight of said isocyanate component, of said polymethylene poly(phenylisocyanate) mixture, and
    2) about 50% by weight, based on the total weight of said isocyanate component, of said polyisocyanate adduct.

13. The process of claim 8, wherein said reaction mixture additionally comprises at least one filler.

14. The process of claim 13, wherein said filler is selected from the group consisting of calcium carbonate, alumina trihydrate and mixtures thereof.

15. The process of claim 2, wherein said 2,2'- and 2,4'-methylene bis(phenylisocyanate) content of i) said isocyanate is no more than about 1%.

* * * * *